(12) United States Patent
Ke et al.

(10) Patent No.: US 11,489,595 B2
(45) Date of Patent: Nov. 1, 2022

(54) SYSTEM AND METHOD FOR SINGLE-STAGE FREQUENCY-DOMAIN EQUALIZATION

(71) Applicant: HUAWEI TECHNOLOGIES CO., LTD., Guangdong (CN)

(72) Inventors: Jianhong Ke, Stittsville (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/227,678

(22) Filed: Apr. 12, 2021

(65) Prior Publication Data
US 2021/0328680 A1 Oct. 21, 2021

Related U.S. Application Data

(60) Provisional application No. 63/010,827, filed on Apr. 16, 2020.

(51) Int. Cl.
| | | |
|---|---|---|
| H04B 10/50 | (2013.01) | |
| H04B 7/0417 | (2017.01) | |
| H04B 10/548 | (2013.01) | |
| H04B 10/2507 | (2013.01) | |
| H04B 7/0456 | (2017.01) | |

(52) U.S. Cl.
CPC ......... H04B 10/5055 (2013.01); H04B 7/046 (2013.01); H04B 7/0417 (2013.01); H04B 10/2507 (2013.01); H04B 10/548 (2013.01)

(58) Field of Classification Search
CPC ............ H04B 10/5055; H04B 10/2507; H04B 10/548; H04B 7/0417; H04B 7/046
USPC .......................................................... 398/183
See application file for complete search history.

(56) References Cited

U.S. PATENT DOCUMENTS

| | | | |
|---|---|---|---|
| 10,547,408 B2 | 1/2020 | He et al. | |
| 2009/0201796 A1 | 8/2009 | Roberts et al. | |
| 2013/0272704 A1* | 10/2013 | Zamani | H04J 14/06 398/65 |

FOREIGN PATENT DOCUMENTS

| | | |
|---|---|---|
| WO | 2004036345 A2 | 4/2004 |
| WO | 2017220153 A1 | 12/2017 |

OTHER PUBLICATIONS

International Search Report and Written Opinion issued in co-pending International application No. PCT/CN2021/087823 dated Jul. 15, 2021.

(Continued)

*Primary Examiner* — Ted M Wang
(74) *Attorney, Agent, or Firm* — BCF LLP

(57) ABSTRACT

The disclosed systems, structures, and methods are directed to a single-stage frequency-domain equalization (FDEQ) structure implemented on a processor, comprising a data preprocessing unit configured to concatenate received data samples in time-domain digital signals, transform the concatenated data samples in the time-domain digital signals to frequency-domain digital signals, and an adaptive equalizer comprising 2×2 multiple-input multiple output (MIMO) configured to compensate for non-time-varying fixed impairments and time-varying adaptive impairments in the frequency-domain digital signals.

18 Claims, 11 Drawing Sheets

(56) References Cited

OTHER PUBLICATIONS

Shynk, J.J. et al., Frequency-Domain and Multirate Adaptive Filtering, IEEE SP Magazine, pp. 14-37, Jan. 1992.
Sun, H et al., Timing synchronization in coherent optocal transmission systems, Enabling Technologies for High Spectral-efficiency Coherent Optical Communication Networks, First Edition, pp. 355-394, 2016.

* cited by examiner

SYSTEM AND METHOD FOR SINGLE-STAGE FREQUENCY-DOMAIN EQUALIZATION

CROSS-REFERENCE TO RELATED APPLICATIONS

This application claims benefit to U.S. Provisional Application No. 63/010,827, entitled "SYSTEM AND METHOD FOR SINGLE-STAGE FREQUENCY-DOMAIN EQUALIZATION", filed on Apr. 16, 2020, the contents of which are incorporated by reference herein in their entirety.

FIELD OF THE INVENTION

The present invention generally relates to the field of communication systems and, in particular, to a single-stage frequency-domain equalization (FDEQ) structure.

BACKGROUND

Generally, signals transmitted over wireless, wired, or optical channels are subject to various linear and non-linear impairments. In order to compensate for these linear and non-linear impairments, various coherent receivers are configured to perform coherent detection together with digital signal processing. In certain applications, such as, short-reach applications, the complexity and power consumption required by digital signal processing measures are of particular concern. Therefore, reducing the complexity and power consumption of such digital signal measures is desirable.

Digital signal processing measures include fixed and adaptive equalizations to compensate for linear impairments. As such, fixed equalizers compensate non-time-varying fixed impairments such as chromatic dispersion (CD), s-parameter S21, match filtering, etc., while adaptive equalizers compensate time-varying adaptive impairments, such as, for example, polarization mode dispersion (PMD), state of polarization (SOP) tracking, and also polarization division de-multiplexing, residual chromatic dispersion (CD), mitigation of inter-symbol interference, etc.

Adaptive equalizers typically implement a butterfly configuration which is often referred to a 2×2 MIMO (multiple input multiple output). Equalizations can be performed in time-domain as well in frequency-domain. However, time-domain equalization occupies a large portion of overall digital signal processing complexity, especially with a large number of taps. One solution to reduce complexity and power consumption is to use frequency-domain equalization (FDEQ) because of the block-by-block updating strategy and efficient implementation of discrete Fourier transform (DFT).

Normally, implementation of FDEQ is performed in two stages: (1) compensating non-time-varying fixed impairments such as CD, S21, match filtering, etc. before MIMO; and (2) compensating adaptive impairments such as PMD, SOP tracking, etc. and residual fixed impairments such as residual CD and S21, etc. using MIMO.

However, it will be appreciated that FDEQ stage (1) requires a large number of multipliers, which takes up a large portion of the overall frequency-domain equalization complexity and contributes to increased power requirements.

SUMMARY

An object of the present disclosure is to provide a single-stage frequency-domain equalization (FDEQ) structure implemented on a processor, comprising a data preprocessing unit configured to concatenate received data samples in time-domain digital signals, transform the concatenated data samples in the time-domain digital signals to frequency-domain digital signals, and an adaptive equalizer comprising 2×2 multiple-input multiple output (MIMO) configured to compensate for non-time-varying fixed impairments and time-varying adaptive impairments in the frequency-domain digital signals.

In accordance with other aspects of the present disclosure, the single-stage FDEQ structure, wherein the adaptive equalizer further comprises a gradient constraint unit configured to set initial MIMO taps as $H_{xx}=H_{yy}=[1\ 1\ 1\ \ldots\ 1] \cdot H\text{comp}$; $H_{xy}=H_{yx}=[0\ 0\ 0\ \ldots\ 0]$, where $H_{xx}$, $H_{yy}$, $H_{xy}$, and $H_{yx}$ are MIMO taps and H comp is compensation response to compensate non-time-varying fixed impairments.

In accordance with other aspects of the present disclosure, the single-stage FDEQ structure, wherein the MIMO taps are updated to compensate time-varying adaptive impairments in accordance with following set of equations:

$$H_{xx}(m+1)=H_{xx}(m)+2\mu \cdot G\{E_x(m)X^*(m)\}$$

$$H_{yx}(m+1)=H_{yx}(m)+2\mu \cdot G\{E_x(m)Y^*(m)\}$$

$$H_{xy}(m+1)=H_{xy}(m)+2\mu \cdot G\{E_y(m)X^*(m)\}$$

$$H_{yy}(m+1)=_{yy}(m)+2\mu \cdot G\{E_y(m)Y^*(m)\}$$

where:

$X^*(m)$ and $Y^*(m)$ are conjugate of the frequency-domain digital signals containing $X(m)$ and $Y(m)$ in x and y polarization respectively, $E_x(m)$ and $E_y(m)$ are error signals associated with the frequency-domain digital signals $X(m)$ and $Y(m)$ respectively, $G\{.\}$ is a gradient constraint, and $\mu$ is a step function.

In accordance with other aspects of the present disclosure, the single-stage FDEQ structure, wherein the MIMO taps are updated to compensate time-varying adaptive impairments in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=H_{yy}(m)+2\mu \cdot G\{E_y(m)Y^*(m)H^*_{comp}\}H_{comp}$$

where:

$X^*(m)$ and $Y^*(m)$ are conjugate of the frequency-domain digital signals containing $X(m)$ and $Y(m)$ in x and y polarization respectively, $E_x(m)$ and $E_y(m)$ are error signals associated with the frequency-domain digital signals $X(m)$ and $Y(m)$ respectively, $G\{.\}$ is a gradient constraint, and ti is a step function.

In accordance with other aspects of the present disclosure, the single-stage FDEQ structure, wherein if the 2×2 MIMO is locked, the MIMO taps are updated in accordance with following set of equations:

$$H_{xx}(m+1)=H_{xx}(m)+2\mu \cdot G\{E_x(m)X^*(m)\}$$

$$H_{yx}(m+1)=H_{yx}(m)+2\mu \cdot G\{E_x(m)Y^*(m)\}$$

$$H_{xy}(m+1)=H_{xy}(m)+2\mu \cdot G\{E_y(m)X^*(m)\}$$

$$H_{yy}(m+1)=_{yy}(m)+2\mu \cdot G\{E_y(m)Y^*(m)\}$$

else, if the 2×2 MIMO is not locked, the MIMO taps are updated in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=H_{yy}(m)+2\mu \cdot G\{E_y(m)Y^*(m)H^*_{comp}\}H_{comp}$$

where:

X*(m) and Y*(m) are conjugate of the frequency-domain digital signals containing X(m) and Y(m) in x and y polarization respectively, $E_x(m)$ and $E_y(m)$ are error signals associated with the frequency-domain digital signals X(m) and Y(m) respectively, G{.} is a gradient constraint, and μ is a step function.

In accordance with other aspects of the present disclosure, the single-stage FDEQ structure, wherein for m blocks of N data samples time-domain digital signals, MIMO taps may be updated n times, where m, n and N are integer values and m is greater than n.

In accordance with other aspects of the present disclosure, the single-stage FDEQ structure further comprises a pre-clock recovery processing unit configured to extract spectral components around frequency $\pm f_b/2$, where $f_b$ is a symbol rate of the time-domain digital signals.

In accordance with other aspects of the present disclosure, the single-stage FDEQ structure, wherein the pre-clock recovery processing unit is further configured to provide chromatic dispersion compensation to the extracted spectral components around frequency $\pm f_b/2$.

In accordance with other aspects of the present disclosure, the pre-clock recovery processing unit provides the chromatic dispersion compensated spectral components around frequency $\pm f_b/2$ to a clock recovery unit, wherein the clock recovery unit is configured to extract clock information from the extracted spectral components around frequency $\pm f_b/2$.

In accordance with other aspects of the present disclosure, the single-stage FDEQ structure, wherein the time-domain digital signals are in x and y polarization.

Another object of the present disclosure is to provide a method for single-stage frequency-domain equalization (FDEQ) comprising: receiving, by a block concatenator, data samples in time-domain digital signals; concatenating, by the block concatenator, the received data samples in the time-domain digital signals; transforming, by a first Fast Fourier Transform (FFT) module, the concatenated data samples in the time-domain digital signals to frequency-domain digital signals; and compensating, by a 2×2 multiple-input multiple output (MIMO), non-time-varying fixed impairments and time-varying adaptive impairments in the frequency-domain digital signals.

In accordance with other aspects of the present disclosure, the method further comprising setting, by a gradient constraint unit, initial MIMO taps as $H_{xx}=H_{yy}=[1\ 1\ 1\ \ldots\ 1]$ Hcomp; $H_{xy}=H_{yx}=[0\ 0\ 0\ \ldots\ 0]$, where $H_{xx}$, $H_{yy}$, $H_{xy}$, and $H_{yx}$ are MIMO taps and Hcomp is compensation response to compensate non-time-varying fixed impairments.

In accordance with other aspects of the present disclosure, the method, wherein the MIMO taps are updated to compensate time-varying adaptive impairments in accordance with following set of equations:

$$H_{xx}(m+1)=H_{xx}(m)+2\mu \cdot G\{E_x(m)X^*(m)\}$$

$$H_{yx}(m+1)=H_{yx}(m)+2\mu \cdot G\{E_x(m)Y^*(m)\}$$

$$H_{xy}(m+1)=H_{xy}(m)+2\mu \cdot G\{E_y(m)X^*(m)\}$$

$$H_{yy}(m+1)=_{yy}(m)+2\mu \cdot G\{E_y(m)Y^*(m)\}$$

where:

X*(m) and Y*(m) are conjugate of the frequency-domain digital signals containing X(m) and Y(m) in X and Y polarization respectively, $E_x(m)$ and $E_y(m)$ are error signals associated with the frequency-domain digital signals X(m) and Y(m) respectively, and G{.} is a gradient constraint, and μ is a step function In accordance with other aspects of the present disclosure, the method, The single-stage FDEQ structure of claim 2, wherein the MIMO taps are updated to compensate time-varying adaptive impairments in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=H_{yy}(m)+2\mu \cdot G\{E_y(m)Y^*(m)H^*_{comp}\}H_{comp}$$

where:

X*(m) and Y*(m) are conjugate of the frequency-domain digital signals containing X(m) and Y(m) in X and Y polarization respectively, $E_x(m)$ and $E_y(m)$ are error signals associated with the frequency-domain digital signals X(m) and Y(m) respectively, and G{.} is a gradient constraint, and μ is a step function In accordance with other aspects of the present disclosure, the method, wherein if the 2×2 MIMO is locked, the MIMO taps are updated in accordance with following set of equations:

$$H_{xx}(m+1)=H_{xx}(m)+2\mu \cdot G\{E_x(m)X^*(m)\}$$

$$H_{yx}(m+1)=H_{yx}(m)+2\mu \cdot G\{E_x(m)Y^*(m)\}$$

$$H_{xy}(m+1)=H_{xy}(m)+2\mu \cdot G\{E_y(m)X^*(m)\}$$

$$H_{yy}(m+1)=_{yy}(m)+2\mu \cdot G\{E_y(m)Y^*(m)\}$$

else, if the 2×2 MIMO is not locked, the MIMO taps are updated in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=H_{yy}(m)+2\mu \cdot G\{E_y(m)Y^*(m)H^*_{comp}\}H_{comp}$$

where:

X*(m) and Y*(m) are conjugate of the frequency-domain digital signals containing X(m) and Y(m) in x and y polarization respectively, $E_x(m)$ and $E_y(m)$ are error signals associated with the frequency-domain digital signals X(m) and Y(m) respectively, G{.} is a gradient constraint, and μ is a step function In accordance with other aspects of the present disclosure, the method, wherein for m blocks of N data samples in the time-domain digital signals, MIMO taps may be updated n times, where m, n and N are integer values and m is greater than n.

In accordance with other aspects of the present disclosure, the method further comprising extracting, by a pre-clock recovery processing unit, spectral components around frequency $\pm f_b/2$, where $f_b$ is a symbol rate of the time-domain digital signals.

In accordance with other aspects of the present disclosure, the method further comprising providing, by the pre-clock recovery processing unit, chromatic dispersion compensation to the extracted spectral components around frequency $\pm f_b/2$.

In accordance with other aspects of the present disclosure, the method further comprising providing, by the pre-clock recovery processing unit, the chromatic dispersion compensated spectral components around frequency $\pm f_b/2$ to a clock recovery unit, wherein the method further comprises extracting, by the clock recovery unit, clock information from the extracted spectral components around frequency $\pm f_b/2$.

In accordance with other aspects of the present disclosure, the method, wherein the time-domain digital signals are in X and Y polarization.

BRIEF DESCRIPTION OF THE FIGURES

The features and advantages of the present disclosure will become apparent from the following detailed description, taken in combination with the appended drawings, in which.

Figure 1:
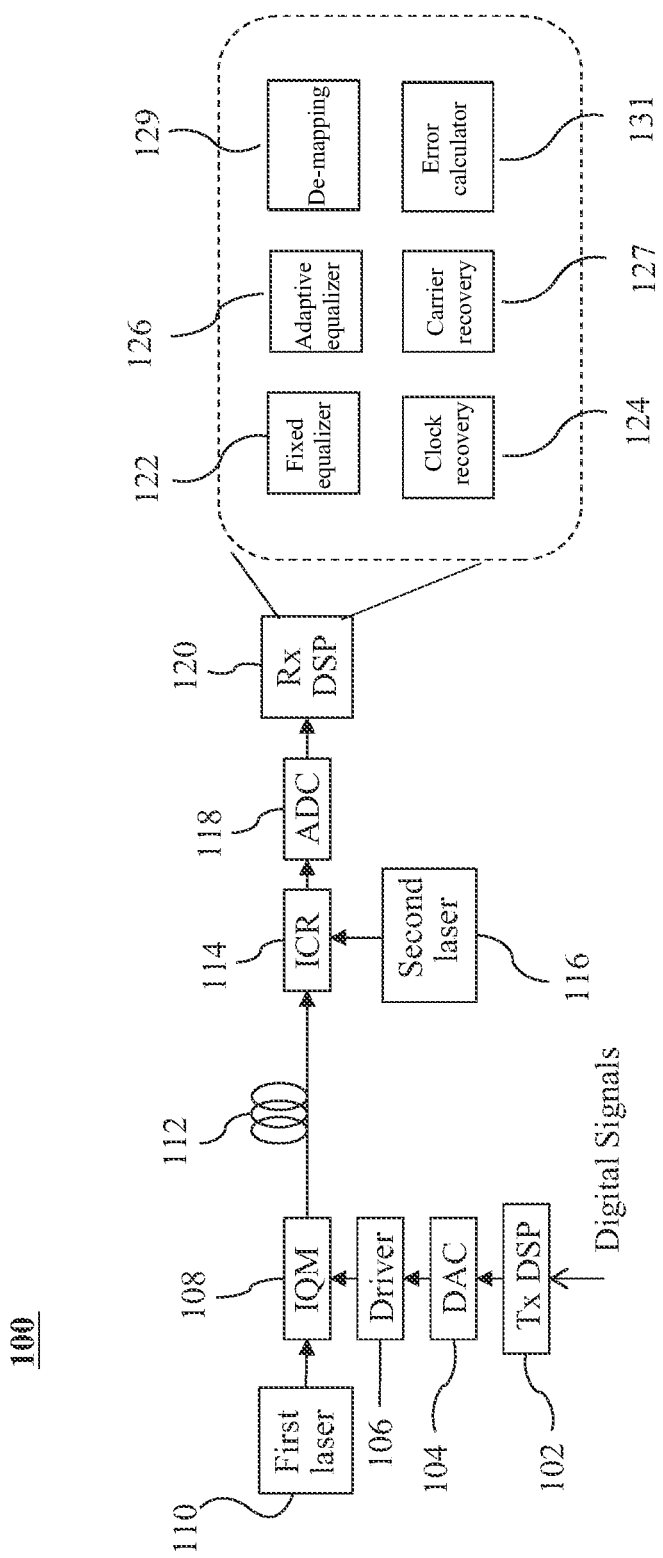
FIG. 1 (Prior Art) depicts a high-level functional block diagram of a conventional coherent system with a digital signal processor (DSP)

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, simply modules, units and structures which are implied to be software, may be represented herein as any combination of flowchart elements or other elements indicating performance of process steps and/or textual description. Such modules, units and other structures may be executed by hardware that is expressly or implicitly shown. Further, such software modules may be physically stored in or incorporated in hardware such as memory. An element, such a single-stage frequency-domain equalization (FDEQ) structure implemented on a processor, may include not only the physical processor, but also the machine-readable instructions that implement the ways in which the processor performs or accomplishes various functions.

With these fundamentals in place, we will now consider some non-limiting examples to illustrate various implementations of aspects of the present technology.

FIG. 1 (Prior Art) depicts a high-level functional block diagram of a conventional coherent system 100 with DSP. As shown, coherent system 100 comprises a transmitter DSP 102, a digital to analogue convertor (DAC) 104, a driver 106, an in-phase quadrature modulator (IQM) 108, a first laser 110, a fiber link 112, an integrated coherent receiver (ICR) 114, a second laser 116, an analogue to digital convertor (ADC) 118, and a receiver DSP 120. It is to be noted that other elements may be implemented but are not illustrated for the purposes of tractability and simplicity.

The transmitter DSP 102 is configured to receive digital signals and perform up-sampling and pre-compensation over the received digital signals. The DAC 104 is configured to convert the up-sampled and pre-compensated digital signals to analogue RF signals. The analogue RF signals are amplified by the driver 106. The amplified analogue RF signals are then modulated to the output of the first laser 110 via IQM 108 to convert the amplified analogue RF signals into optical signals having X-polarization and Y-polarization.

The X- and Y-polarized optical signals are transmitted through fiber link 112. It will be appreciated that conventional coherent system 100 is configured to transmit optical signals but in other conventional coherent systems may transmit the analogue RF signals in wireless medium. The transmitted signals whether optical or wireless are still subject to various linear and non-linear impairments.

The X- and Y-polarized optical signals are detected in ICR 114 with a local oscillator that includes second laser 116. In so doing, the ICR 114 converts the optical signals back to X- and Y-polarized analogue RF signals. The ADC 118 is configured to convert the X- and Y-polarized analogue RF signals to X- and Y-polarized digital signals. The X- and Y-polarized digital signals are then forwarded the receiver DSP 120 for various digital signal processing measures including impairment compensation.

The receiver DSP 120 further includes a fixed equalizer 122, a clock recovery unit 124, an adaptive equalizer 126, a carrier recovery module 126, carrier recovery module 127, a de-mapping module 129, and an error calculator 131. It is to be noted that other elements may be present but not illustrated for the purposes of tractability and simplicity.

The fixed equalizer 122 is configured to compensate for non-time-varying fixed impairments such as chromatic dispersion (CD), s-parameter S21, match filtering, etc. in the X- and Y-polarized digital signals. The clock recovery unit 124 is configured to extract the clock information from the non-time-varying fixed impairments compensated X- and Y-polarized digital signals.

In turn, adaptive equalizer 126 is configured to compensate for time-varying adaptive impairments such as polarization mode dispersion (PMD), polarization division de-multiplexing, state of polarization (SOP) tracking, residual chromatic dispersion (CD), and mitigation of inter-symbol interference, etc. The carrier recovery module 127 is configured to provide frequency offset compensation to the time-varying adaptive impairments compensated digital signals in X-polarization and Y-polarization. The carrier recovery module 127 is further configured to recover phase of carrier signal from the time-varying adaptive impairments. The de-mapping module 129 is configured to convert the symbols in the time-varying, adaptive impairments-compensated X- and Y-polarized digital signals into bits and the error calculator 131 is configured to compute bit error rate (BER) in the bits.

Typically, the fixed equalizer 122 and the adaptive equalizer 126 are two different DSP functional modules and the clock recovery unit 124 uses the output of the fixed equalizer 122 to extract clock information to reduce complexity. These three function modules may be implemented in frequency-domain.

Figure 2:
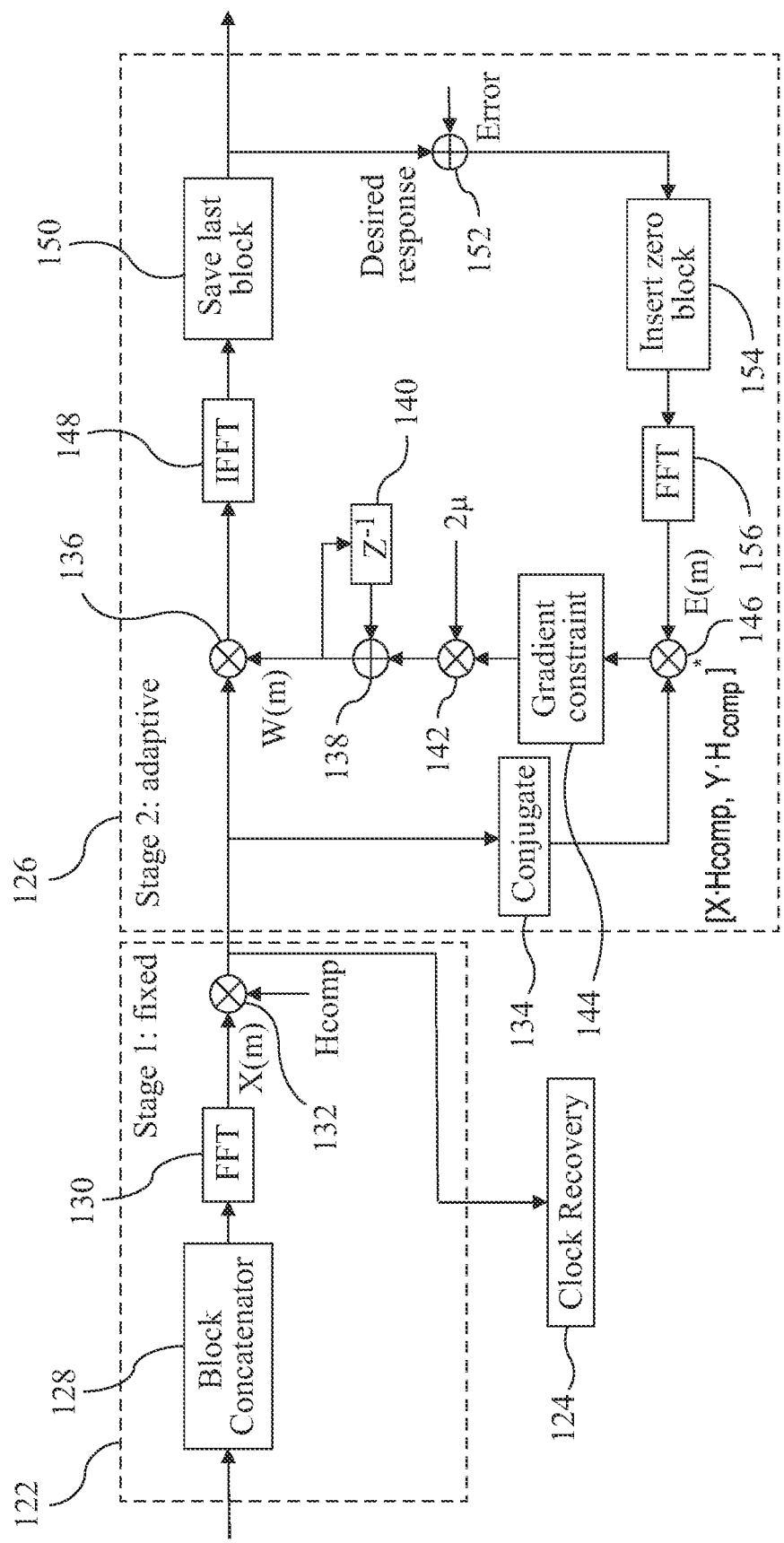
FIG. 2 (Prior Art) illustrates a conventional frequency-domain equalization (FDEQ) structure including a fixed equalizer, a clock recovery unit, and an adaptive equalizer.

FIG. 2 (Prior Art) illustrates a conventional frequency-domain equalization (FDEQ) structure that includes fixed equalizer 122, clock recovery unit 124, and adaptive equalizer 126. As shown, fixed equalizer 122 includes a block concatenator 128, a first Fast Fourier transformation (FFT) module 130, and a first multiplier 132. The adaptive equalizer 126 includes a conjugate module 134, a 2×2 MBMO (multiple input multiple output) 136, a first adder 138, a delay element 140, a second multiplier 142, a gradient constraint unit 144, a third multiplier 146, an inverse FFT (IFFT) module 148, a save last block module 150, a second adder 152, an insert zero block module 154, and a second FFT module 156. It is to be noted that other elements may be present but not illustrated for the purposes of tractability and simplicity.

Figure 3:
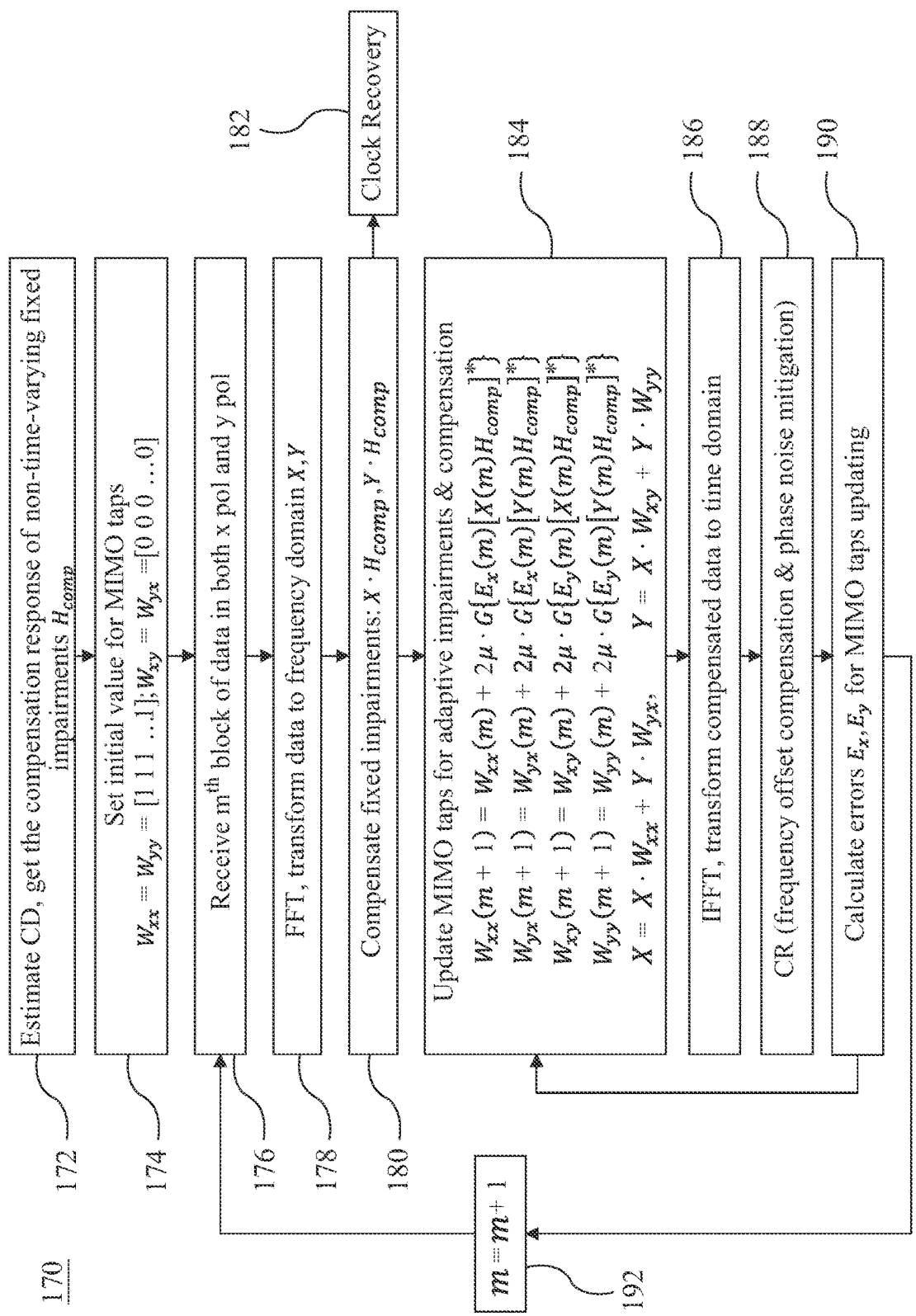
FIG. 3 (Prior Art) depicts a flowchart representing a process corresponding to a conventional FDEQ operations.

FIG. 3 depicts a flowchart representing a process 170 for conventional FDEQ operations. Beginning at step 172, receiver DSP 120 estimates a CD and gets a compensation response $H_{comp}$ in the frequency-domain to compensate non-time-varying fixed impairments. Process 170 proceeds to step 174, where the gradient constraint unit 144 sets the initial value for MIMO taps for the 2×2 MIMO 136 as $W_{xx}=W_{yy}=[1\ 1\ 1\ \ldots\ 1]; W_{xy}=W_{yx}=[0\ 0\ 0\ \ldots\ 0]$. In particular, various components of the adaptive equalizer 126 work together to update the MIMO taps.

Process 170 proceeds to step 176. At step 176, concatenator block 128 is configured to concatenate X- and Y-polarized data samples in the time-domain digital signals. For example, the block concatenator 128 concatenates the $m^{th}$ block of most recent X-polarized N data samples with previous block of X-polarized N data samples in the data in digital signals. Similarly, the block concatenator 128 concatenates the $m^{th}$ block of most recent Y-polarized N data samples with previous block of Y-polarized N data samples in the data in digital signals. Hence, the overall length of the $m^{th}$ block of the X- and Y-polarized data in digital signals is 2N.

Process 170 advances to step 178, where the first FFT module 130 performs 2N point FFT and transforms the X- and Y-polarized data samples in time-domain digital signals to frequency-domain X- and Y-polarized digital signals. Such that, if the X- and Y-polarized time-domain digital signals are represented by x and y corresponding X- and Y-polarized frequency-domain digital signals may be represented by X and Y respectively. It is to be noted that the operation of the fixed equalizer 122 to compensate non-time-varying fixed impairments turns to vector multiplication in frequency-domain.

Process 170 moves to step 180. At step 180, the first multiplier 132 multiplies to X- and Y-polarized frequency-domain digital signals with the compensation response $H_{comp}$ to compensate non-time-varying fixed impairments. In so doing, the first multiplier 132 multiplies X- and Y-polarized frequency-domain digital signals with the compensation response $H_{comp}$. Such that the output of the first multiplier is $X \cdot H_{comp}$ and $Y \cdot H_{comp}$. At step 182, the first multiplier 132 provides $X \cdot H_{comp}$ and $Y \cdot H_{comp}$ to the clock recovery unit 124 to extract the clock information.

Process 170 proceeds to step 184. At step 184, the 2×2 MIMO 136 compensates for time-varying adaptive impairments with the initial value for MIMO taps and the MIMO taps are updated in accordance with following equations:

$$W_{xx}(m+1)=W_{xx}(m)+2\mu \cdot G\{E_x(m)[X(m)H_{comp}]^*\} \quad (1)$$

$$W_{yx}(m+1)=W_{yx}(m)+2\mu \cdot G\{E_x(m)[Y(m)H_{comp}]^*\} \quad (2)$$

$$W_{xy}(m+1)=W_{xy}(m)+2\mu \cdot G\{E_y(m)[X(m)H_{comp}]^*\} \quad (3)$$

$$W_{yy}(m+1)=W_{yy}(m)+2\mu \cdot G\{E_y(m)[Y(m)H_{comp}]^*\} \quad (4)$$

Figure 4:
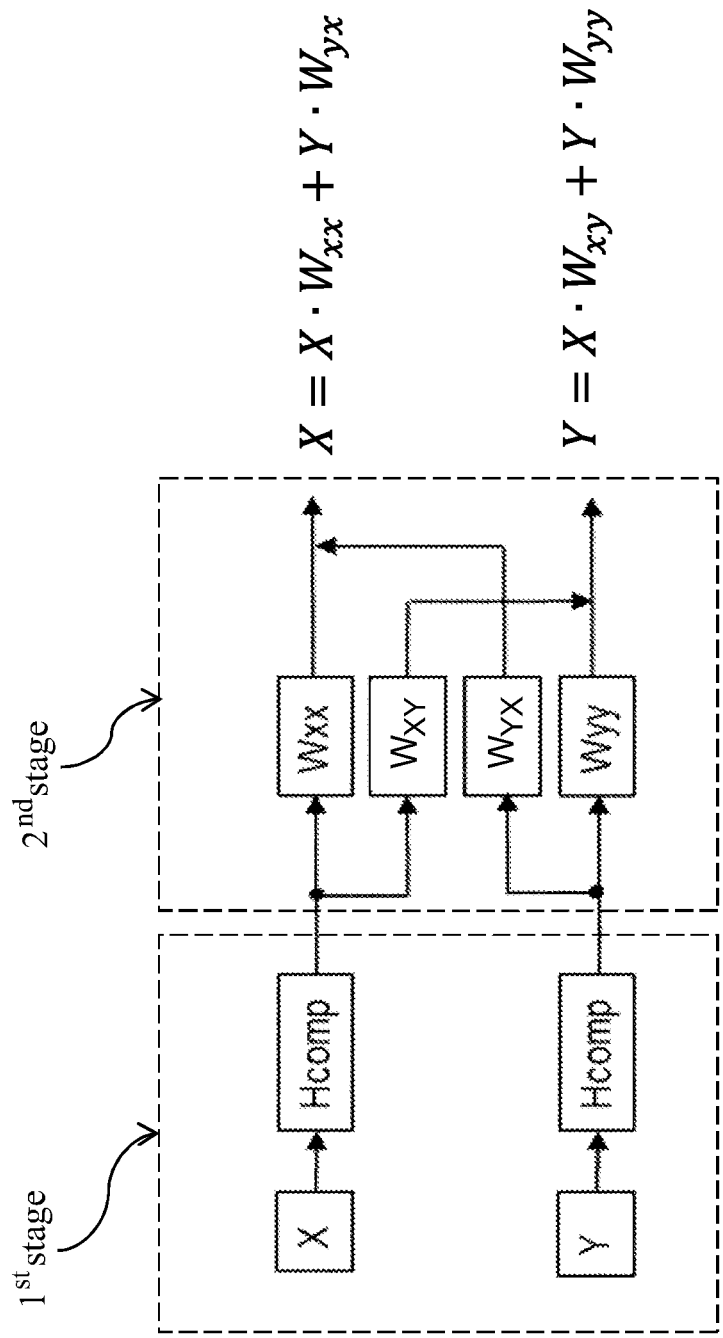
FIG. 4 (Prior Art) illustrates high-level block diagram of a conventional 2-stage butterfly structure corresponding to the 2×2 MIMO.

And X is updated to $X=X \cdot W_{xx}+Y \cdot W_{yx}$, Y is updated to $Y=X \cdot W_{xy}+Y \cdot W_{yy}$. FIG. 4 (Prior Art) illustrates high-level block diagram of a conventional 2-stage butterfly structure corresponding to the 2×2 MIMO 136. As shown, the $1^{st}$ stage is configured to compensate non-time-varying fixed impairments with the help of the first multiplier 132 and the $2^{nd}$ stage is configured to compensate for time-varying adaptive impairments with the help of 2×2 MIMO 136.

Returning to FIG. 3, in order to update the MIMO taps, process 170 proceeds to step 186. At step 186, the output of the 2×2 MIMO 136 $X=X \cdot W_{xx}+Y \cdot W_{yx}$ and $Y=X \cdot W_{xy}+Y \cdot W_{yy}$ are provided to IFFT module 148. The IFFT module 148 is configured to perform 2N point IFFT on frequency-domain digital signals X and Y to convert them into corresponding time-domain digital signals x and y.

The time-domain digital signals x and y are provided to the save last block module 150. The save last block module 150 removes first N samples from x and y. Process 170 proceeds to step 188. At step 188, the carrier recovery module 127 performs frequency offset compensation and phase noise mitigation. Process 170 proceeds to step 190. At step 190, the second adder 152, the receiver DSP 120 subtracts the output of the save last block module 150 from a desired response to generate a time-domain error signal. It is to be noted that the length of the error signal is N.

The time-domain error signal is provided to insert zero block module 154. The insert zero block module 154 is configured to add a block of N zeros to the time-domain error signal in order to make the length of the error signal back to 2N. The second FFT module 156 performs 2N point to convert the time-domain error signal into frequency-domain error signals $E_x(m)$ and $E_y(m)$ in X-polarization and Y-polarization respectively. The X- and Y-polarized frequency-domain error signals $E_x(m)$ and $E_y(m)$ are provided to the third multiplier 146.

Also the output of the first multiplier 132 provides $X \cdot H_{comp}$ and $Y \cdot H_{comp}$ is conjugated by the conjugate module 134. The conjugate module 134 provides conjugated output [X·Hcomp, Y·Hcomp]* to the third multiplier 146. The third multiplier 146 multiplies the conjugated [X·Hcomp, Y·Hcomp]* and X- and Y-polarized frequency-domain error signals $E_x(m)$ and $E_y(m)$ and provides the resultant to the gradient constraint unit 144.

The gradient constraint unit 144 may be configured to generate a gradient constraint G{.} from the output of the third multiplier 146. Typically, the gradient constraint unit 144 performs IFFT on the received data samples having a length of 2N, deletes last N samples of the time-domain received data samples, adds a block of N zeroes and performs 2N point FFT to gradient constraint G{.}. The gradient constraint G{.} is multiplied with 2μ by the second multiplier 142 to generate updated MIMO taps as represented by equations (1)-(4), where represents a step size. In order to provide the 2×2 MIMO 136 with current MIMO taps, the first adder 138 and the delay element 140 provides a delay to the updated MIMO taps to provide current MIMO taps $W_{xx}(m)$, $W_{yx}(m)$, $W_{xy}(m)$, $W_{yy}(m)$ to the 2×2 MIMO 136.

Process 170 provides the frequency-domain error signals $E_x(m)$ and $E_y(m)$ to step 184 and process 170 proceeds to step 192. At step 192 where the m is updated m+1 and process 170 is returned to step 176. It is to be noted that process 170 update MIMO taps in accordance with the frequency-domain error signals $E_x(m)$ and $E_y(m)$.

It is to be noted that the vector multiplication in $1^{st}$ stage in FIG. 4 (Prior Art) consists of many multipliers, which may vary from hundreds to thousands. The number of multipliers may depend upon fiber length and sample rate resulting in CD. As such, a large number of multipliers takes up a large portion of the overall conventional FDEQ structure complexity and contributes to more power consumption.

Figure 5:
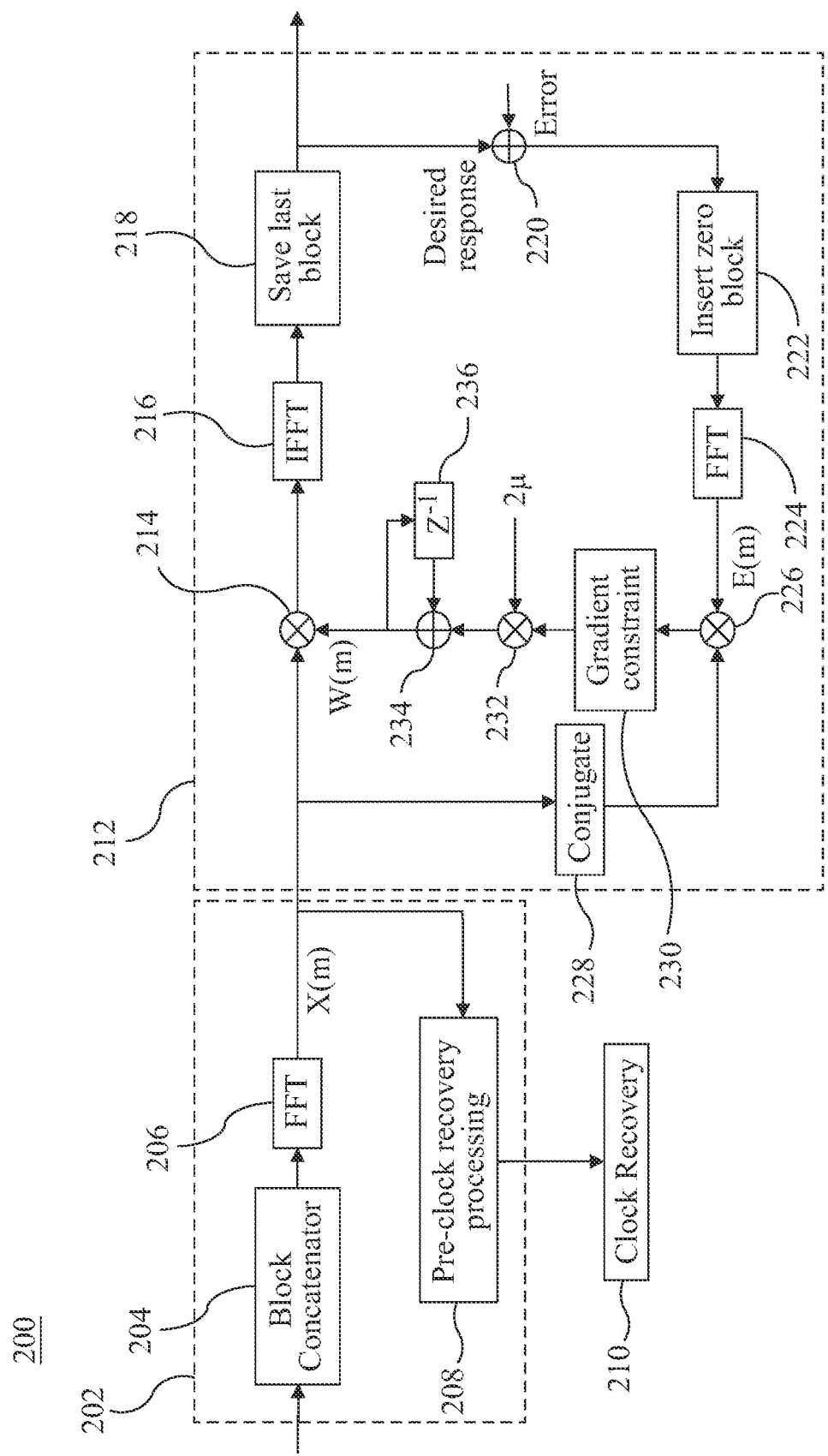
FIG. 5 illustrates a high-level functional block diagram of a single-stage FDEQ structure, in accordance with various embodiments of present disclosure.

To this end, FIG. 5 illustrates a high-level functional block diagram of a single-stage FDEQ structure 200, in accordance with various embodiments of present disclosure. As shown, the single-stage FDEQ structure 200 comprises a data preprocessing unit 202 and an adaptive equalizer 212. It is to be noted that other elements may be present but not illustrated for the purposes of tractability and simplicity.

It is to be contemplated that the single-stage FDEQ structure 200 may include various hardware components such as general purpose processors, DSPs, adders, subtractors, multipliers, delay elements, memory elements, buffer elements, clock generators or the like. In one non-limiting embodiment, the single-stage FDEQ structure 200 may be implemented on the receiver DSP 120.

The data preprocessing unit 202 includes a block concatenator 204, a first FFT module 206, and a pre-clock recovery processing unit 208. The adaptive equalizer 212 includes a 2×2 MIMO 214, an IFFT module 216, a save last block module 218, a first adder 220, an insert zero block module 222, and a second FFT module 224, a first multiplier 226, a conjugate module 228, a gradient constraint unit 230, a second multiplier 232, a second adder 234, and a delay element 236. It is to be noted that other elements may be present but not illustrated for the purposes of tractability and simplicity.

The single-stage FDEQ structure 200 uses only one equalizer, i.e. the adaptive equalizer 212, which is configured to compensate for both non-time-varying fixed impairments as well as time-varying adaptive impairments. In the single-stage FDEQ structure 200 the compensation response $H_{comp}$ is combined with the MIMO taps W(m) by setting the initial value of MIMO taps as $H_{xx}=H_{yy}=[1\ 1\ 1\ \ldots\ 1] \cdot H_{comp}$; $H_{xy}=H_{yx}=[0\ 0\ 0\ \ldots\ 0]$. In so doing, the data preprocessing unit 202 associated with the single-stage FDEQ structure 200 has a reduced hardware complexity as compared to the hardware complexity associated with the fixed equalizer 122. It will be appreciated that in certain embodiments, the single-stage FDEQ structure 200 may be implemented on the receiver DSP 120.

Figure 6:
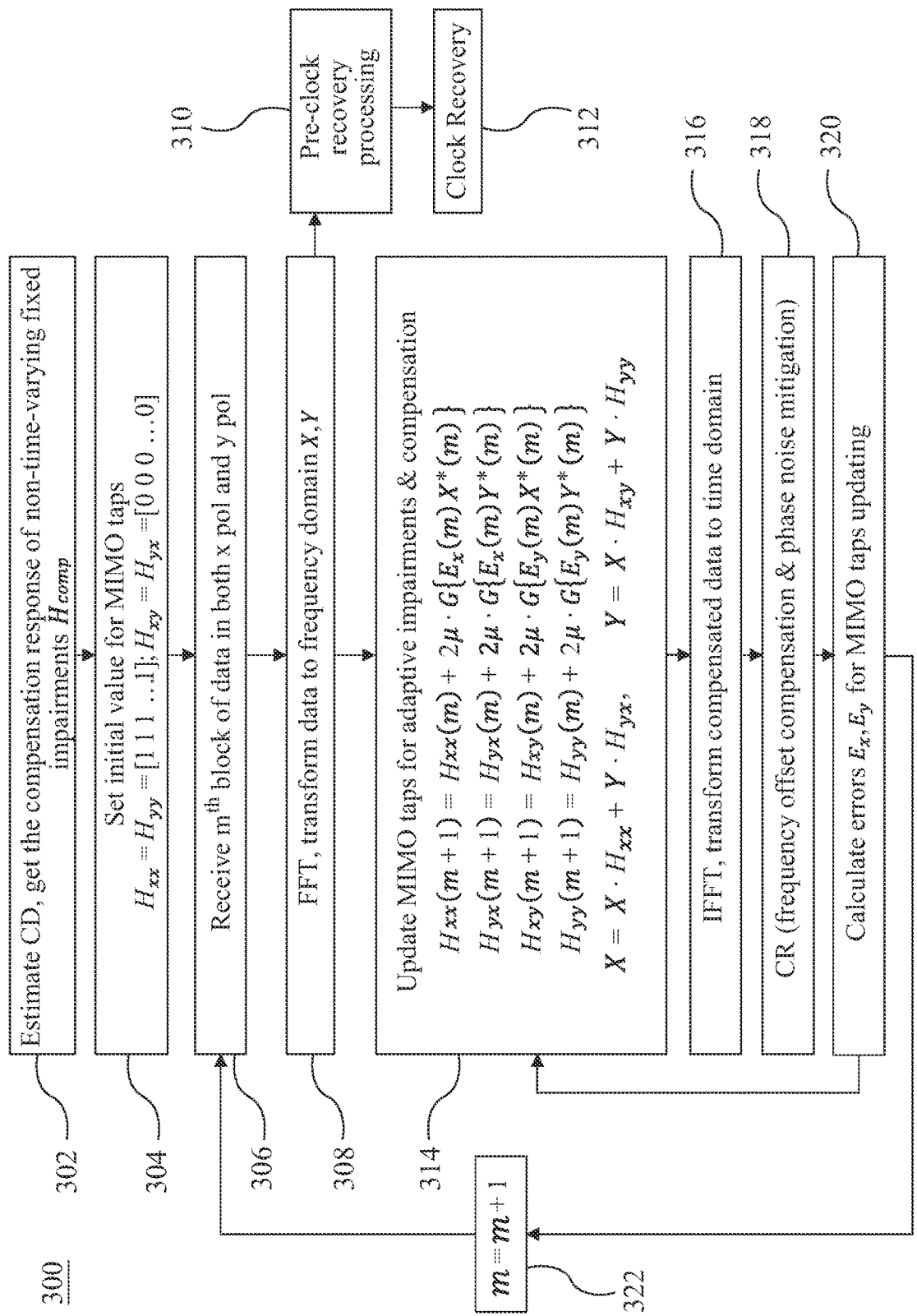
FIG. 6 depicts a flowchart representing a process corresponding to a single-stage FDEQ structure, in accordance with various embodiments of the present disclosure.

FIG. 6 depicts a flowchart representing a process 300 corresponding to a single-stage FDEQ structure 200, in accordance with various embodiments of the present disclosure. As shown, process 300 begins at step 302. At step 302, the receiver DSP 120 estimates CD and gets a compensation response $H_{comp}$ in frequency-domain to set initial values of MIMO taps H(m). Process 300 proceeds to step 304, where the initial value for MIMO taps for the 2×2 MIMO 214 as $H_{xx}=H_{yy}=[1\ 1\ 1\ \ldots\ 1] \cdot H_{comp}$; $H_{xy}=H_{yx}=[0\ 0\ 0\ \ldots\ 0]$.

Process 300 proceeds to step 306. At step 306, the concatenator block 204 is configured to receive and concatenate X- and Y-polarized data samples in time-domain digital signals. For example, the block concatenator 204 concatenates the $m^{th}$ block of most recent X-polarized N data samples with previous block of X-polarized N data samples in the data in digital signals. Similarly, the block concatenator 204 concatenates the $m^{th}$ block of most recent Y-polarized N data samples with previous block of Y-polarized N data samples in the data in digital signals. Hence, the overall length of the $m^{th}$ block of the X- and Y-polarized data in digital signals is now 2N.

Process 300 advances to step 308. At step 308, the first FFT module 206 performs 2N point FFT and transforms the concatenated X- and Y-polarized data samples in time-domain digital signals to X- and Y-polarized frequency-domain digital signals. Such that, if the X- and Y-polarized time-domain digital signals are represented by x and y corresponding X- and Y-polarized frequency-domain digital signals may be represented by X and Y respectively.

Process 300 moves to step 310. At step 310, the pre-clock recovery processing unit 208 receives X- and Y-polarized frequency-domain digital signals. A person skilled in the art would understand that the CD compensation should be processed prior to clock recovery and there is no separate non-time-varying fixed impairments compensation in data path. To this end, in certain embodiments the pre-clock recovery processing unit 208 is configured to process only that data in the frequency-domain digital signals which contains timing information. For example, if the symbol rate of the time-domain digital signals is $f_b$, the pre-clock recovery processing unit 208 may extract spectral components around frequency $\pm f_b/2$. Further, the pre-clock recovery processing unit 208 is configured to provide CD compensation to the extracted spectral components around frequency $\pm f_b/2$. The pre-clock recovery processing unit 208 provides the CD compensated spectral components around frequency $\pm f_b/2$ to a clock recovery unit 210. In certain embodiments, the clock recovery unit 210 may be implemented on the receiver DSP 120.

Process 300 moves to step 312. At step 312, the clock recovery unit 210 extracts clock information from the extracted spectral components around frequency $\pm f_b/2$. It is to be noted that in prior art for example the clock recovery unit 124 is configured to process the non-time-varying fixed impairments compensated X- and Y-polarized frequency digital signals for extracting clock information. However, the clock recovery unit 210 processes only the spectral components around frequency $\pm f_b/2$ in the X- and Y-polarized frequency-domain digital signals for extracting the clock information. In so doing, the hardware complexity associated with the clock recovery unit 210 is further reduced. It will be appreciated the added complexity to the single-stage FDEQ structure 200 complexity in terms of the pre-clock recovery processing unit 208 is small, in return the overall complexity of the receiver DSP 120 is still greatly reduced while compensating for non-time-varying fixed impairments as well as time-varying adaptive impairments.

Process 300 proceeds to step 314. At step 314, the 2×2 MIMO 214 compensates for time-varying adaptive impairments with the initial value for MIMO taps and the MIMO taps are updated in accordance with following equations:

$$H_{xx}(m+1)=H_{xx}(m)+2\mu \cdot G\{E_x(m)X^*(m)\} \quad (5)$$

$$H_{yx}(m+1)=H_{yx}(m)+2\mu \cdot G\{E_x(m)Y^*(m)\} \quad (6)$$

$$H_{xy}(m+1)=H_{xy}(m)+2\mu \cdot G\{E_y(m)X^*(m)\} \quad (7)$$

$$H_{yy}(m+1)=H_{yy}(m)+2\mu \cdot G\{E_y(m)Y^*(m)\} \quad (8)$$

And X is updated to $X=X \cdot H_{xx}+Y \cdot H_{yx}$, Y is updated to $Y=X \cdot H_{xy}+Y \cdot H_{yy}$. It is to be noted that once the initial MIMO taps have been updated, the 2×2 MIMO 214 compensates for time-varying adaptive impairments with the updated MIMO taps in next cycle.

Figure 7:
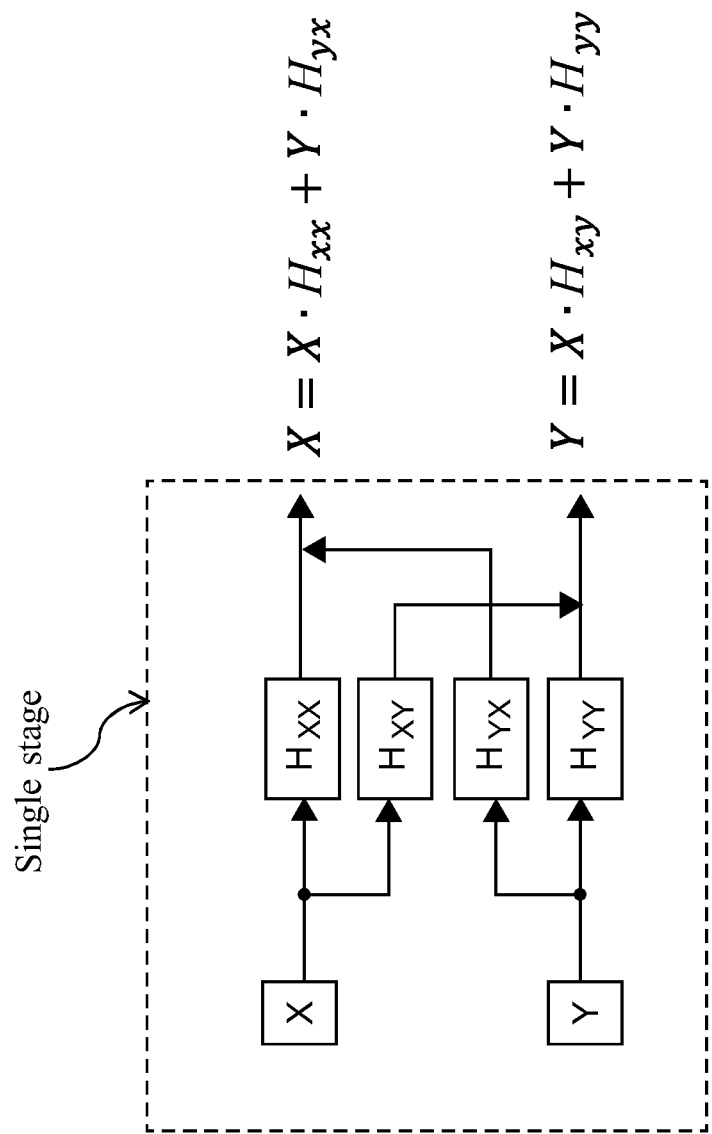
FIG. 7 illustrates high-level block diagram of the single-stage butterfly structure corresponding to the 2×2 MIMO, in accordance with various embodiments of the present technology.

FIG. 7 illustrates high-level block diagram of the single-stage butterfly structure corresponding to the 2×2 MIMO 214, in accordance with various embodiments of the present technology. As shown, the X- and Y-polarized frequency-domain digital signals directly go to the 2×2 MIMO 214. Thus, the implementation of 2×2 MIMO 214 in the manner discussed above, reduces hardware complexity, as multiplier 132 (as shown in FIG. 2) may not be required for compensation of non-time-varying fixed impairments and the non-time-varying fixed impairments as well as time-varying adaptive impairments may be compensated by 2×2 MIMO 214.

Returning to FIG. 6, in order to update the MIMO taps, process 300 proceeds to step 316. At step 316, the output of the 2×2 MIMO 214 $X=X \cdot H_{xx}+Y \cdot H_{yx}$ and $Y=X \cdot H_{xy}+Y \cdot H_{yy}$ are provided to IFFT module 216. The IFFT module 216 is configured to perform 2N point IFFT on frequency-domain digital signals X and Y to convert them into corresponding time-domain digital signals x and y.

The time-domain digital signals x and y are provided to the save last block module 218. The save last block module 218 removes first N samples from x and y. The save last block module 218 may provide its output to the carrier recovery module 127 and to the first adder 220. Process 300 proceeds to step 318. At step 318, the carrier recovery module 127 performs frequency offset compensation and phase noise mitigation. Process 300 proceeds to step 320. At step 320, the first adder 220, the receiver DSP 120 subtracts the output of the save last block module 218 from a desired response to generate a time-domain error signal. It is to be noted that the length of the error signal is N.

The time-domain error signal is provided to the insert zero block module 222. The insert zero block module 222 is configured to add a block of N zeroes to the time-domain error signal in order to make the length of the error signal back to 2N. The second FFT module 224 performs 2N point to convert the time-domain error signal into frequency-domain error signals $E_x(m)$ and $E_y(m)$ in X-polarization and Y-polarization respectively. The X- and Y-polarized frequency-domain error signals $E_x(m)$ and $E_y(m)$ are provided to the first multiplier 226.

Also the output of the first FFT module 206 X, Y is conjugated by the conjugate module 134. The conjugate module 134 provides conjugated [X, Y]*to the first multiplier 226. The first multiplier 226 multiplies the conjugated [X, Y]* and X- and Y-polarized frequency-domain error signals $E_x(m)$ and $E_y(m)$ and provides the resultant to the gradient constraint unit 230.

The gradient constraint unit 230 may be configured to generate a gradient constraint G{. } from the output of the first multiplier 226. In certain non-limiting embodiments, the gradient constraint unit 230 performs IFFT on the received data samples having a length of 2N, deletes last N samples of the time-domain received data samples, adds a block of N zeros and performs 2N point FFT to gradient constraint G{.}. The gradient constraint G{.} is multiplied with 2μ by the second multiplier 232 to generate updated MIMO taps as represented by equations (5)-(6), where μ represents a step size. In order to provide the 2×2 MIMO 214 with current MIMO taps, the first adder 234 and the delay element 236 provides a delay to the updated MIMO taps to provide current MIMO taps $H_{xx}(m)$, $H_{yx}(m)$, $H_{xy}(m)$, $H_{yy}(m)$ to the 2×2 MIMO 214.

Process 300 provides the frequency-domain error signals $E_x(m)$ and $E_y(m)$ to step 314 and process 300 proceeds to step 322. At step 322 where the m is updated m+1 and process 300 is returned to step 306. It is to be noted that process 300 update MIMO taps in accordance with the frequency-domain error signals $E_x(m)$ and $E_y(m)$.

It is to be noted that process by which the single-stage FDEQ structure 200 updates the MIMO taps is mathematically different from the process by which the conventional FDEQ structure (as shown in FIG. 2) updates the MIMO taps. In order to develop a comparison, given that $H(m)=W(m)H_{comp}$, $H(m+1)=W(m+1)H_{comp}$ and equation (1) can be rewritten in terms of H(m) as follows:

$$H_{xx}(m+1)=H_{xx}(m)+2\mu \cdot G\{E_x(m)X^*(m)H^*_{comp}\}H_{comp} \quad (9)$$

A similar expression can be developed for equations (2)-(3). On comparing equation (9) and equation (5) a person skilled in the art would readily understand that equation (9) and equation (5) are not mathematically equal and could establish the difference between the two equations. Although, this difference could slightly affect the performance the single-stage FDEQ structure 200 in terms of compensation at the same time the hardware complexity associated with the single-stage FDEQ structure 200 may be reduced significantly.

It will be appreciated that the single-stage FDEQ structure 200 can be used instead of the conventional FDEQ structure (as shown in FIG. 2) with little sacrifice of the performance in terms of compensation. However, in certain embodiments under certain conditions, such as severe or noisy channel conditions, there may be a need for fast and reliable equalization convergence.

Figure 8:
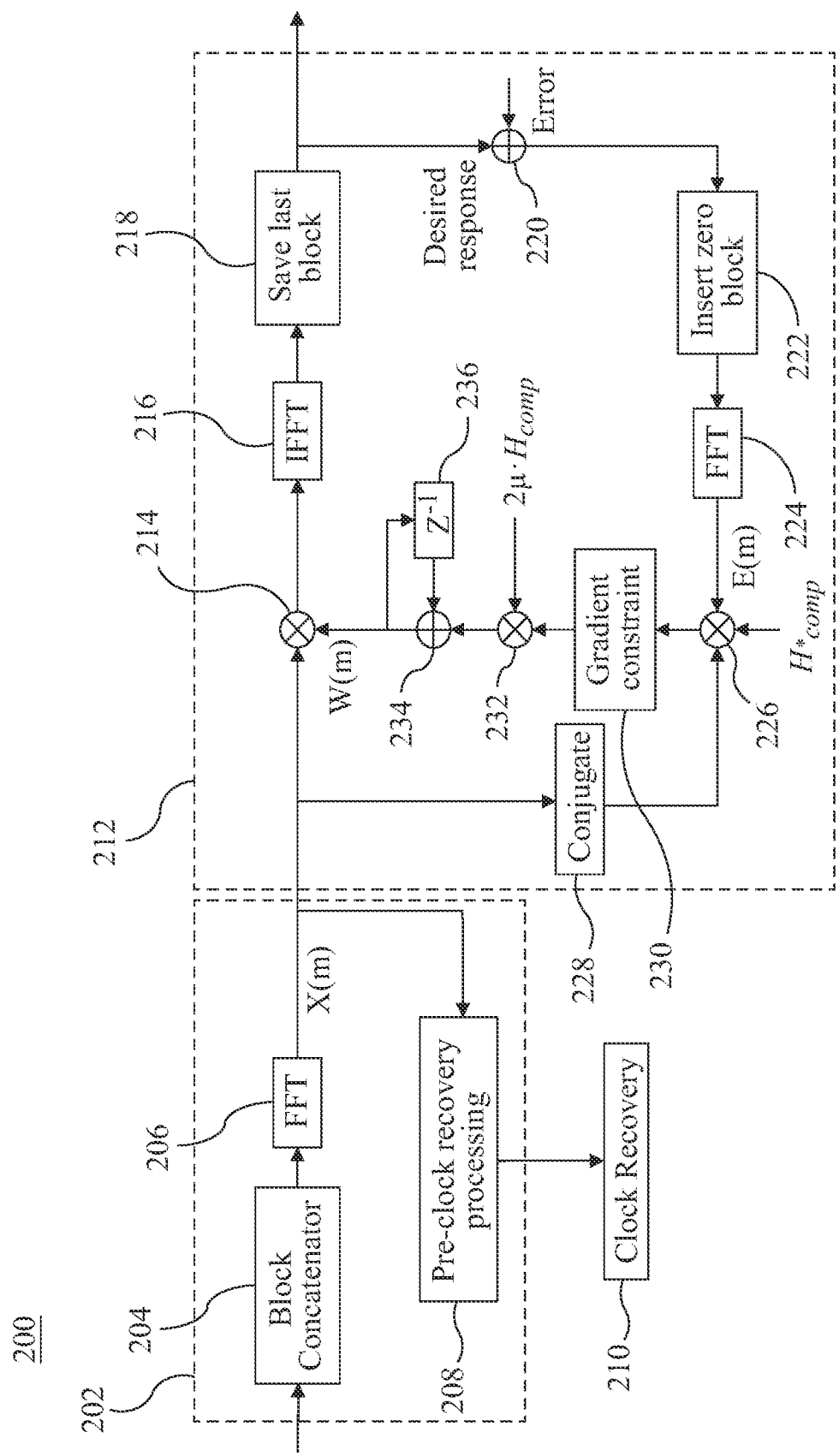
FIG. 8 illustrates a high-level functional block diagram of the single-stage FDEQ structure, in accordance with another embodiment of the present disclosure.

To this end, in order to ensure performance of the single-stage FDEQ structure 200 FIG. 8 illustrates a high-level functional block diagram of the single-stage FDEQ structure 200, in accordance with another embodiment of the present disclosure. As shown, the first multiplier 226 is further provided with the conjugate of the conjugate of the compensation response $H_{comp}$. Also, the gradient constraint $G\{.\}$ is now multiplied with $2\mu \cdot H_{comp}$ instead of $2\mu$ by the second multiplier 232 to generate updated MIMO taps. In so doing, the MIMO taps are updated in a similar manner as being updated by the conventional FDEQ structure (as shown in FIG. 2).

It is contemplated that such modifications would require additional vector-multiplications in the single-stage FDEQ structure 200. However, the compensation response $H_{comp}$ related additional multiplications are all in the MIMO taps updating path and the MIMO taps updating rate could be much lower than the rate with which data associated with the digital signals flow in the data path. Such as, in a non-limiting example for m blocks of N data samples MIMO taps may be updated n times, where m is greater than n. Therefore, the overall complexity of the single-stage FDEQ structure 200 is still lower than the conventional FDEQ structure (as shown in FIG. 2). Also, in this case the associated power consumption would be less as compared to power consumption by the conventional FDEQ structure (as shown in FIG. 2).

Figure 9:
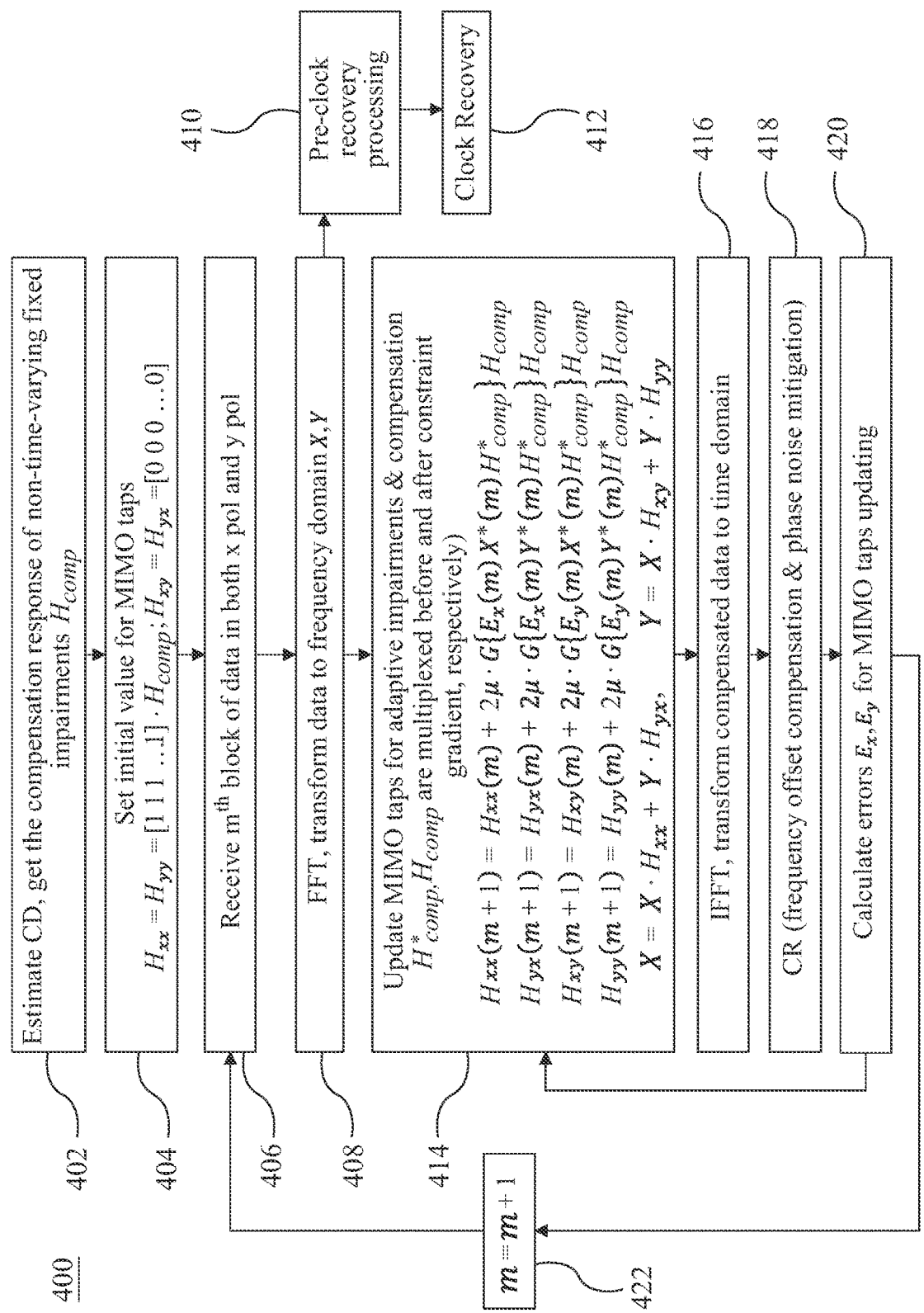
FIGS. 9-10 depict flowcharts representing processes for the single-stage FDEQ structure, in accordance with various embodiments of the present disclosure.

FIG. 9 depicts a flowchart representing a process 400 corresponding to a single-stage FDEQ structure 200, in accordance with various embodiments of the present disclosure. It is contemplated that in certain embodiments, steps 402-412 and steps 416-422 may be implemented in a similar manner as steps 302-312 and steps 316-322 respectively associated with process 300. However, the difference lies at step 414. At step 414, the 2×2 MIMO 214 compensates for time-varying adaptive impairments with the initial value for MIMO taps and the MIMO taps are updated in accordance with following equations:

$$H_{xx}(m+1)=H_{xx}(m)+2\mu \cdot G\{E_x(m)X^*(m)H^*_{comp}\}H_{comp} \quad (10)$$

$$H_{yx}(m+1)=H_{yx}(m)+2\mu \cdot G\{E_x(m)Y^*(m)H^*_{comp}\}H_{comp} \quad (11)$$

$$H_{xy}(m+1)=H_{xy}(m)+2\mu \cdot G\{E_y(m)X^*(m)H^*_{comp}\}H_{comp} \quad (12)$$

$$H_{yy}(m+1)=H_{yy}(m)+2\mu \cdot G\{E_y(m)Y^*(m)H^*_{comp}\}H_{comp} \quad (13)$$

And X is updated to $X=X \cdot H_{xx}+Y \cdot H_{yx}$, Y is updated to $Y=X \cdot H_{xy}+Y \cdot H_{yy}$. It is to be noted that once the initial MIMO taps have been updated, the 2×2 MIMO 214 compensates for time-varying adaptive impairments with the updated MIMO taps in next cycle.

In yet another embodiment of present disclosure, the single-stage FDEQ structure 200 may be configured to initially update MIMO taps in accordance with equations (10)-(13). In certain embodiments, the receiver DSP 120 computes root mean square (rms) values of the time-domain error signal generated by the first adder 220. If the rms value is smaller than certain threshold the receiver DSP 120 locks the 2×2 MIMO 214. Once the 2×2 MIMO 214 is in locked state, the single-stage FDEQ structure 200 may be configured to update MIMO taps in accordance with equations (5)-(8). In so doing, the performance of the single-stage FDEQ structure 200 in terms of power consumption is improved as compared to when the MIMO taps are only updated in accordance with equations (10)-(13) only. Moreover, the performance of the single-stage FDEQ structure 200 in terms of how effectively the non-time-varying fixed impairments as well as time-varying adaptive impairments are compensated is improved as compared to when the MIMO taps are only updated in accordance with equations (5)-(8) only.

Figure 10:
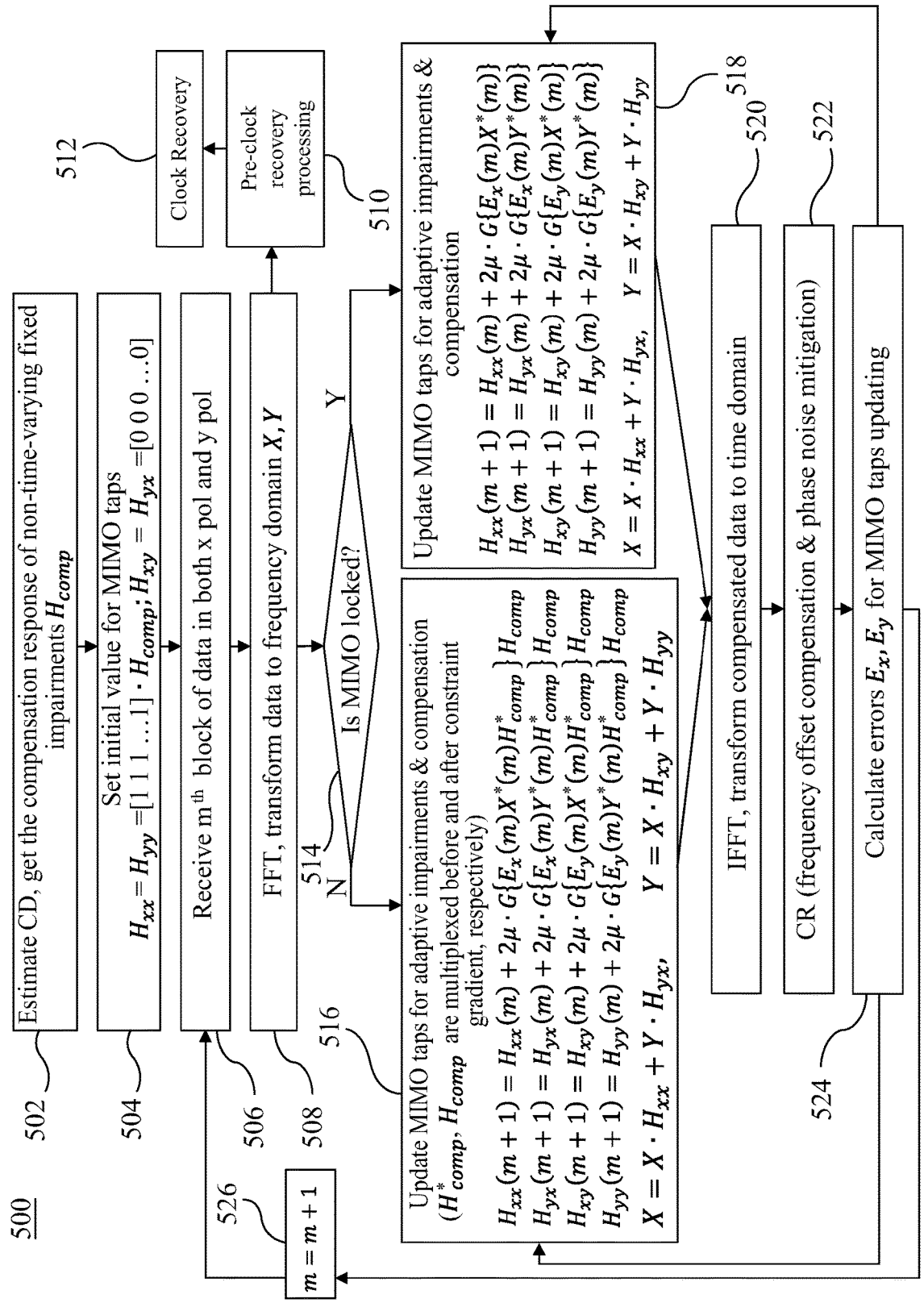

FIG. 10 depicts a flowchart representing a process 500 corresponding to a single-stage FDEQ structure 200, in accordance with various embodiments of the present disclosure. It is contemplated that in certain embodiments, steps 502-512, 520-522, and 526 may be implemented in a similar manner as steps 302-312, 316-318, and 322 that are respectively associated with process 300. However, the difference lies at steps 514-518 and 524.

In particular, at step 514 the receiver DSP 120 examine if the 2×2 MIMO 214 is in locked state or not. If the 2×2 MIMO 214 is not locked, process 500 advances to step 516. At step 516, the 2×2 MIMO 214 compensates for time-varying adaptive impairments with the initial value for MIMO taps and the MIMO taps are updated in accordance equations (10)-(13). If the 2×2 MIMO 214 is in locked state, process 500 advances to step 518. At step 518, the 2×2 MIMO 214 compensates for time-varying adaptive impairments with the initial value for MIMO taps and the MIMO taps are updated in accordance equations (5)-(8). It is to be noted that once the initial MIMO taps have been updated, the 2×2 MIMO 214 compensates for time-varying adaptive impairments with the updated MIMO taps in next cycle.

Process 500 advances to step 520, which as previously discussed, steps 520-522 may be implemented in a similar manner as steps 316-318. Process proceeds to step 524. At step 524, if the 2×2 MIMO 214 is not locked, process 500 provides the frequency-domain error signals $E_x(m)$ and $E_y(m)$ to step 516 and if the 2×2 MIMO 214 is locked, process 500 provides the frequency-domain error signals $E_x(m)$ and $E_y(m)$ to step 518. Finally, process 500 proceeds at step 526 where the m is updated m+1 and process 526 is returned to step 506.

Figure 11:
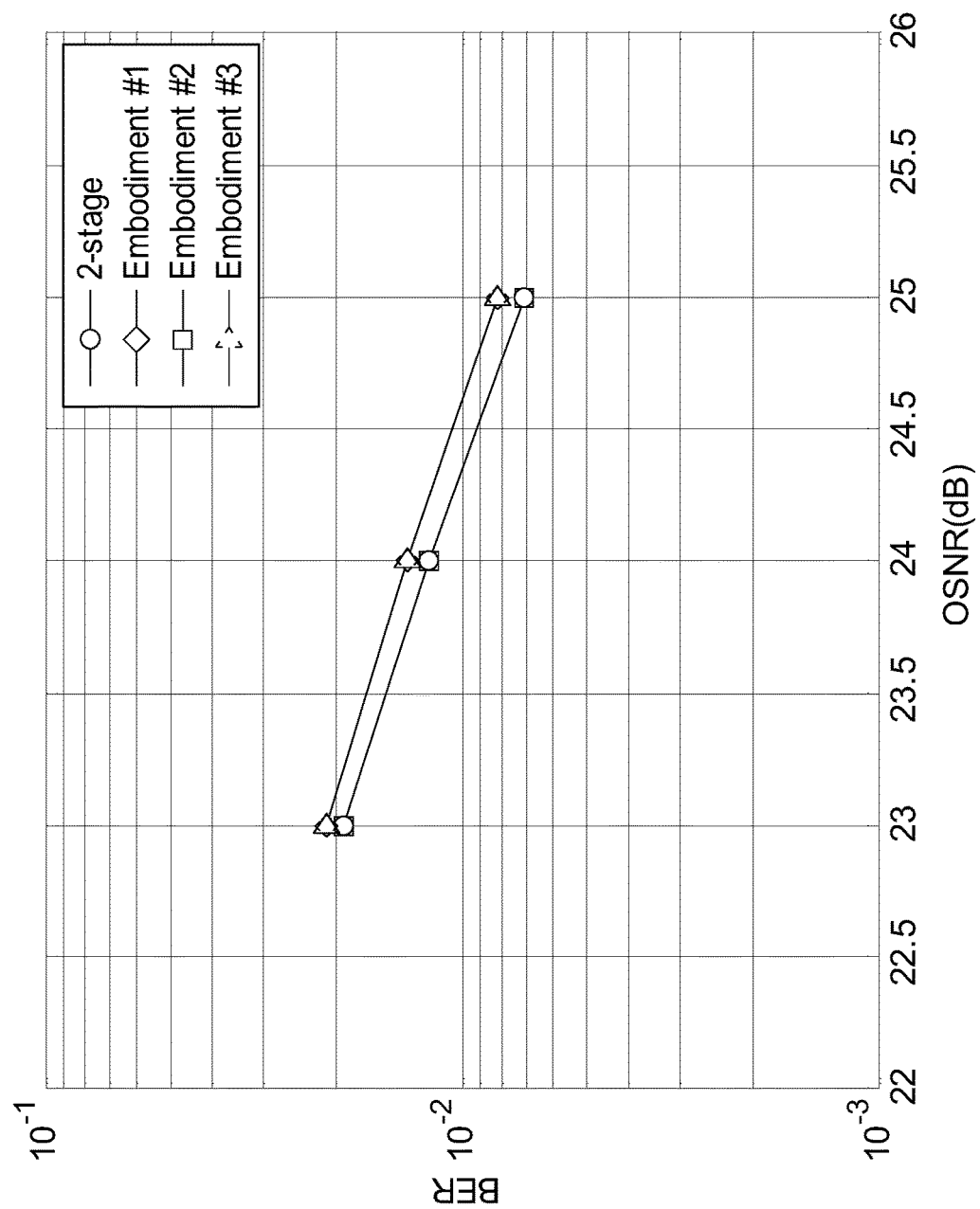
FIG. 11 illustrates performance comparison of the conventional FDEQ structure and the single-stage FDEQ structure in terms of bit error rate (BER) and optical signal to noise ratio (OSNR), in accordance with various embodiments of present disclosure.

FIG. 11 illustrates performance comparison of the conventional FDEQ structure and the single-stage FDEQ structure 200 in terms of bit error rate (BER) and optical signal to noise ratio (OSNR), in accordance with various embodiments of present disclosure. As shown, the performance of the conventional FDEQ structure is same as the single-stage FDEQ structure 200 when implemented based on process 400. However, the single-stage FDEQ structure 200 in this case may consume less power as compared to the conventional FDEQ structure (as shown in FIG. 2).

The performance of the single-stage FDEQ structure 200 is slightly reduced as compared to the performance of the conventional FDEQ structure, when the single-stage FDEQ structure 200 is implemented according to processes 300 or 500. However, the hardware complexity and power consumption are still less than the hardware complexity and power consumption of the conventional FDEQ structure.

Thus, by virtue of techniques provided by the single-stage FDEQ structure 200, hardware complexity and power consumption may be reduced. It is to be understood that the operations and functionality of the single-stage FDEQ structure 200, as well as its constituent components and associated processes, may be achieved by one or more of the hardware-based, software-based, firmware-based elements combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A single-stage frequency-domain equalization (FDEQ) apparatus implemented on a receiver, comprising:
 a data preprocessing unit configured to:
  concatenate received data samples in time-domain digital signals,
  transform the concatenated data samples in the time-domain digital signals to frequency-domain digital signals; and
 an adaptive equalizer comprising:
  2×2 multiple-input multiple output (MIMO) configured to compensate for non-time-varying fixed impairments and time-varying adaptive impairments in the frequency-domain digital signals, wherein a MIMO tap of the MIMO is set to an initial value associated with $H_{comp}$, and the MIMO tap is updated based on the $H_{comp}$ and $H^*_{comp}$, wherein the $H_{comp}$ is a compensation response to compensate non-time-varying fixed impairments, the $H^*_{comp}$ is a conjugate of $H_{comp}$.

2. The single-stage FDEQ apparatus of claim 1, wherein the adaptive equalizer further comprises a gradient constraint unit configured to set initial MIMO taps as $H_{xx}=H_{yy}=[1\ 1\ 1\ \ldots\ 1]$; $H_{xy}=H_{yx}=[0\ 0\ 0\ \ldots\ 0]$, where $H_{xx}$, $H_{yy}$, $H_{xy}$, and $H_{yx}$ are MIMO taps.

3. The single-stage FDEQ apparatus of claim 2, wherein the MIMO taps are updated to compensate time-varying adaptive impairments in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=_{yy}(m)+2\mu \cdot G\{E_y(m)Y^*(m)H^*_{comp}\}H_{comp}$$

where:
 $X^*(m)$ and $Y^*(m)$ are conjugate of the frequency-domain digital signals containing X(m) and Y(m) in X and Y polarization respectively,
 $E_x(m)$ and $E_y(m)$ are error signals associated with the frequency-domain digital signals X(m) and Y(m) respectively, and
 $G\{.\}$ is a gradient constraint, and pt is a step function.

4. The single-stage FDEQ apparatus of claim 2, wherein if the 2×2 MIMO is locked, the MIMO taps are updated in accordance with following set of equations:

$$H_{xx}(m+1)=H_{xx}(m)+2\mu \cdot G\{E_x(m)X^*(m)\}$$

$$H_{yx}(m+1)=H_{yx}(m)+2\mu \cdot G\{E_x(m)Y^*(m)\}$$

$$H_{xy}(m+1)=H_{xy}(m)+2\mu \cdot G\{E_y(m)X^*(m)\}$$

$$H_{yy}(m+1)=_{yy}(m)+2\mu \cdot G\{E_y(m)Y^*(m)\}$$

else, if the 2×2 MIMO is not locked, the MIMO taps are updated in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=H_{yy}(m)+2\mu \cdot G\{E_y(m)Y^*(m)H^*_{comp}\}H_{comp}$$

where:
 $X^*(m)$ and $Y^*(m)$ are conjugate of the frequency-domain digital signals containing X(m) and Y(m) in X and Y polarization respectively,
 $E_x(m)$ and $E_y(m)$ are error signals associated with the frequency-domain digital signals X(m) and Y(m) respectively, and
 $G\{.\}$ is a gradient constraint, and $\mu$ is a step function.

5. The single-stage FDEQ apparatus of claim 2, wherein for m blocks of N data samples in the time-domain digital signals, MIMO taps are updated n times, where m, n and N are integer values and m is greater than n.

6. The single-stage FDEQ apparatus of claim 1 further comprises a pre-clock recovery processing unit configured to extract spectral components around frequency $\pm f_b/2$, where $f_b$ is a symbol rate of the time-domain digital signals.

7. The single-stage FDEQ apparatus of claim 6, wherein the pre-clock recovery processing unit is further configured to provide chromatic dispersion compensation to the extracted spectral components around frequency $\pm f_b/2$.

8. The single-stage FDEQ structure apparatus of claim 7, wherein the pre-clock recovery processing unit provides the chromatic dispersion compensated spectral components around frequency $\pm f_b/2$ to a clock recovery unit, wherein the clock recovery unit is configured to extract clock information from the extracted spectral components around frequency $\pm f_b/2$.

9. The single-stage FDEQ apparatus of claim 1, wherein the time-domain digital signals are in X and Y polarization.

10. A method for single-stage frequency-domain equalization (FDEQ) comprising:
receiving, by a block concatenator, data samples in time-domain digital signals;
concatenating, by the block concatenator, the received data samples in the time-domain digital signals;
transforming, by a first Fast Fourier Transform (FFT) module, the concatenated data samples in the time-domain digital signals to frequency-domain digital signals; and
compensating, by a 2×2 multiple-input multiple output (MIMO), non-time-varying fixed impairments and time-varying adaptive impairments in the frequency-domain digital signals, wherein a MIMO tap of the MIMO is set to an initial value associated with $H_{comp}$, and the MIMO tap is updated based on the $H_{comp}$ and $H^*_{comp}$, wherein the $H_{comp}$ is a compensation response to compensate non-time-varying fixed impairments, the $H^*_{comp}$ is a conjugate of $H_{comp}$.

11. The method of claim 10 further comprising setting, by a gradient constraint unit, initial MIMO taps as $H_{xx}=H_{yy}=[1\ 1\ 1\ \ldots\ 1]$; $H_{xy}=H_{yx}=[0\ 0\ 0\ \ldots\ 0]$, where $H_{xx}$, $H_{yy}$, $H_{xy}$, and $H_{yx}$, are MIMO taps.

12. The method of claim 11, wherein the MIMO taps are updated to compensate time-varying adaptive impairments in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

where: $H_{yy}(m+1)=H_{yy}(m)+2\mu \cdot G\{E_y(m)Y^*(m)H^*_{comp}\}H_{comp}$

X*(m) and Y*(m) are conjugate of the frequency-domain digital signals containing X(m) and Y(m) in X and Y polarization respectively, $E_x(m)$ and $E_y(m)$ are error signals associated with the frequency-domain digital signals X(m) and Y(m) respectively, and G{.} is a gradient constraint, and µ is a step function.

13. The method of claim 11, wherein if the 2×2 MIMO is locked, the MIMO taps are updated in accordance with following set of equations:

$$H_{xx}(m+1)=H_{xx}(m)+2\mu \cdot G\{E_x(m)X^*(m)\}$$

$$H_{yx}(m+1)=H_{yx}(m)+2\mu \cdot G\{E_x(m)Y^*(m)\}$$

$$H_{xy}(m+1)=H_{xy}(m)+2\mu \cdot G\{E_y(m)X^*(m)\}$$

$$H_{yy}(m+1)=_{yy}(m)+2\mu \cdot G\{E_y(m)Y^*(m)\}$$

else, if the 2×2 MIMO is not locked, the MIMO taps are updated in accordance with following set of equations:

$$H_{xx}(m+1)=H_{xx}(m)+2\mu \cdot G\{E_x(m)X^*(m)H^*_{comp}\}H_{comp}$$

$$H_{yx}(m+1)=H_{yx}(m)+2\mu \cdot G\{E_x(m)Y^*(m)H^*_{comp}\}H_{comp}$$

$$H_{xy}(m+1)=H_{xy}(m)+2\mu \cdot G\{E_y(m)X^*(m)H^*_{comp}\}H_{comp}$$

$$H_{yy}(m+1)=H_{yy}(m)+2\mu \cdot G\{E_y(m)Y^*(m)H^*_{comp}\}H_{comp}$$

where:
X*(m) and Y*(m) are conjugate of the frequency-domain digital signals containing X(m) and Y(m) in X and Y polarization respectively, $E_x(m)$ and $E_y(m)$ are error signals associated with the frequency-domain digital signals X(m) and Y(m) respectively, and G{.} is a gradient constraint, and µ is a step function.

14. The method of claim 11, wherein for m blocks of N data samples in the time-domain digital signals, MIMO taps may be are updated n times, where m, n and N are integer values and m is greater than n.

15. The method of claim 10 further comprising extracting, by a pre-clock recovery processing unit, spectral components around frequency $\pm f_b/2$, where $f_b$ is a symbol rate of the time-domain digital signals.

16. The method of claim 15 further comprising providing, by the pre-clock recovery processing unit, chromatic dispersion compensation to the extracted spectral components around frequency $\pm f_b/2$.

17. The method of claim 16 further comprising providing, by the pre-clock recovery processing unit, the chromatic dispersion compensated spectral components around frequency $\pm fb/2$ to a clock recovery unit, wherein the method further comprises extracting, by the clock recovery unit, clock information from the extracted spectral components around frequency $\pm f_b/2$.

18. The method of claim 10, wherein the time-domain digital signals are in X and Y polarization.

* * * * *

UNITED STATES PATENT AND TRADEMARK OFFICE
CERTIFICATE OF CORRECTION

PATENT NO. : 11,489,595 B2
APPLICATION NO. : 17/227678
DATED : November 1, 2022
INVENTOR(S) : Jianhong Ke et al.

It is certified that error appears in the above-identified patent and that said Letters Patent is hereby corrected as shown below:

In the Claims

Column 15, Lines 65 and 66, Claim 2 should read: -- initial MIMO taps as $H_{xx} = H_{yy} = [1\ 1\ 1\ ...1] \cdot H_{comp}$ --.

Column 17, Lines 23 and 24, Claim 11 should read: -- initial MIMO taps as $H_{xx} = H_{yy} = [1\ 1\ 1\ ...1] \cdot H_{comp}$ --.

Signed and Sealed this
Twenty-fifth Day of July, 2023

Katherine Kelly Vidal
*Director of the United States Patent and Trademark Office*